United States Patent Office 3,458,553
Patented July 29, 1969

3,458,553
PROCESS FOR THE PRODUCTION OF AMINO-ALKYL SILICON COMPOUNDS
Hans Niederprüm, Monheim, Elmar-Manfred Horn, Kuerten, near Cologne, and Walter Simmler, Leverkusen, Germany, assignors to Farbenfabriken Bayer Aktiengesellschaft, Leverkusen, Germany, a corporation of Germany
No Drawing. Filed Mar. 12, 1965, Ser. No. 439,477
Claims priority, application Germany, Mar. 14, 1964, F 42,314
Int. Cl. C07f 7/08, 7/18, 7/10
U.S. Cl. 260—448.2                                        19 Claims

ABSTRACT OF THE DISCLOSURE

Production of aminoalkyl-silicon compounds by hydrogenation of an organo-silicon compound containing carbon-bonded nitrogen such as monomeric silane having the formula

or a linear or heterocyclic silicon compound having the formula

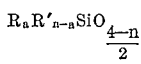

or

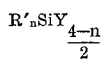

in which each substituent X is alkoxy, aroxy or halogen, each substituent R is cyanoalkyl or carbamidoalkyl, having at least 3 carbon atoms in the chain between the nitrogen atom and the silicon atom, each substituent R' is alkyl, cycloalkyl, aryl, or neutrally substituted alkyl, cycloalkyl or aryl, or the substituent X, each substituent Y is a member bonded to two silicon atoms such as oxygen or β-substituted propylene radicals having the formulae

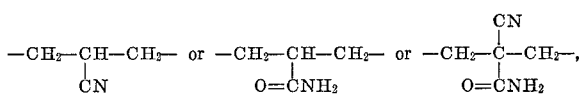

at least one such substituent Y being a β-substituted propylene, $a$ is a positive number of at most 1 and $n$ is a number greater than 1 and at most equal to 3, e.g. at a temperature 30–200° C., with a complex boron-hydrogen compound having the formula $H_3BZ$ in which Z is a ligand such as amines, alkali metal hydrides or alkaline earth metal hydrides, in the case of the said metal hydrides, if none of the substituents X is a halogen atom, then also in the presence of a boron halide, and solvolyzing the primary product of addition of water, dilute acid, alkali metal hydroxide solution, or alcohols, and recovering the end product, the hydrogenation reaction optionally being carried out in an inert medium, e.g. solvents and dispersing agents.

---

The invention relates to the hydrogenation of cyanoalkyl and carbamidoalkyl groups bound to silicon to produce primary amino compounds.

It is known to prepare such compounds by reacting ammonia with haloalkyl-silicon compounds. This reaction is disadvantageous not only because the last-mentioned compounds are comparatively difficult to obtain, but also in that it generally proceeds slowly and always yields only mixtures of mono-, di- and tri-silyl-substituted amines.

It is also known to react catalytically the more readily available cyanoalkyl-silicon compounds with hydrogen. This process necessitates expensive devices because of the high pressure required and of the long reaction time, and it also leads only to the mixtures mentioned above.

The further known hydrogenation by means of lithium alanate which is difficult to obtain and to handle, can only be applied to neutrally substituted cyanoalkylsilanes, since the Si—O—Si as well as the C—O—Si bands are split by $LiAlH_4$.

It has now been found that cyanoalkyl-silicon compounds as well as carbamidoalkyl-silicon compounds which have a carbon chain of at least three carbon atoms between the nitrogen atom and the silicon atom, can be hydrogenated without the aforesaid disadvantages in a technically simple manner by means of suitable boron-hydrogen compounds, and that compounds with primary amino groups are thus exclusively obtained. The silicon compounds can be linear or cyclic, substituted siloxanes or silcarbanes as well as organo-silanes which contain, besides cyano-alkyl and carbamidoalkyl radicals, halogen atoms or alkoxy or aroxy radicals bound to silicon, which makes a further reaction of the hydrogenated products possible. The boron-hydrogen compound used for hydrogenation can be a borazane, i.e. amine-borine, or an alkali metal or alkaline earth metal borohydride. The borohydrides have to be combined with a boron halide the addition of which can be dispensed with if the silicon compound to be hydrogenated contains silicon-bound halogen.

According to the present invention aminoalkyl-silicon compounds are produced by hydrogenation of organo-silicon compounds containing carbon-bonded nitrogen in a process which comprises reacting an organo-silicon compound which may be a monomeric silane of the general formula

or a linear or heterocyclic silicon cmopound of one of the general formulae

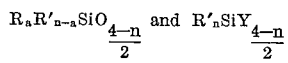

in which each substituent X is an alkoxy or aroxy radical or a halogen atom, each substituent R is a cyanoalkyl or carbamidoalkyl radical with at least 3 carbon atoms in a chain between the nitrogen atom and the silicon atom, each substituent R' is an optionally neutrally substituted alkyl, cycloalkyl or aryl radical, preferably methyl or phenyl, or a radical as defined for X, each substituent Y is an oxygen atom —O—, which bonded to two silicon atoms, or a β-substituted propylene radical bonded in the same manner and having one of the formulae

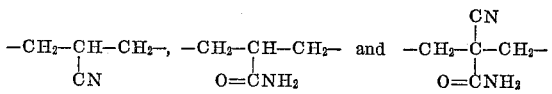

$a$ is a positive number of at most 1, and $n$ is a number greater than 1 and at most equal to 3, at a temperature between 30 and 200° C., optionally in an inert solvent or dispersing agent, with a complex boron-hydrogen compound of the general formula $H_3BZ$, in which Z denotes an amine, or an alkali metal or alkaline earth metal hydride, in the last-mentioned cases, if none of the substituents X is simultaneously a halogen atom, in the presence of a boron halide, and solvolyzing the primary product by the addition of water, a dilute acid or an alkali metal hydroxide solution or an acohol, and recovering the end product by known methods.

Examples of organosilanes to be hydrogenated are: β-cyanoethyl-trichlorosilane, β-cyanoethyl-methyl-dichlorosilane, γ-cyanopropyl-dimethyl-chlorosilane, β-cyanoethyl-diethoxy-chlorosilane, β-cyanoethyl-trimethoxysilane, γ-cyanopropyl-triethoxysilane, β-cyanoethyl-methyl-diethoxysilane, β-carbamidoethyl-dimethyl-ethoxysilane.

Examples of linear organo-siloxanes of the general formula

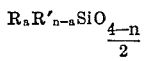

are: 1,3-di-(β-cyanoethyl)-tetramethyl-disiloxane, 1,3-di-(γ-cyanopropyl)-tetramethyl-disiloxane, 1,3-di-(γ-carbamidopropyl)-tetramethyl-disiloxane, α,ω-di-(γ'-cyanopropyl)-polydimethyl-siloxane and copolymers, e.g. of the formula

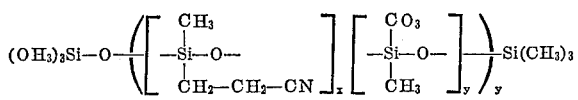

in which $x$ is a whole number, and $y$ is a whole number or zero.

The linear organo-siloxanes of the general formula

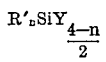

include, for example: α,γ-bis-(dimethyl-chlorosilyl)-β-cyanopropane, α,γ-bis-(dimethyl-ethoxysilyl)-β-carbamido-propane, and copolymers, e.g. of the formula

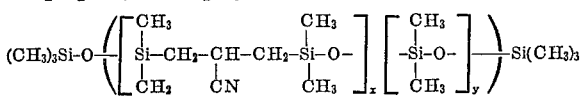

Heterocyclic organo-siloxanes of the general formula

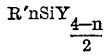

are, for example: 4-cyano-2,2,6,6-tetramethyl-1-oxa-2,6-disila-cyclohexane

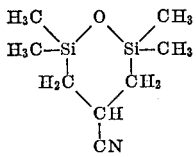

4-carbamido-2,2,6,6-tetramethyl-1-oxa-2,6-disila-cyclohexane

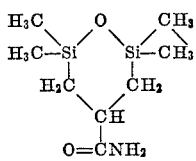

and 4-cyano-4-carbamido-2,2,6,6-tetramethyl-1-oxa-2,6-disila-cyclohexane

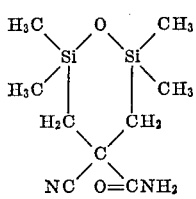

If the hydrogenating agents of the formula $H_3BZ$ are borazanes, i.e. borine amines, Z may be a heterocyclic, optionally alkylated nitrogen base or a primary, secondary or tertiary amine whose substituents are uniform or different aliphatic, cycloaliphatic or aromatic hydrocarbon radicals. N-diethyl-borazane, i.e. N-diethyl-borine amine, can be used, for example, but N-trisubstituted borazanes, i.e. N-trisubstituted borine amines, e.g. N-trimethyl-borazane, i.e. N-trimethyl-borine amine, N-triethyl-borazane, i.e. N-triethyl-borine amine, N-tripropyl-borazane, i.e. N-tripropyl-borine amine, N-butyl-N-diethyl-borazane, i.e. N-butyl-N-diethyl-borine amine, N-cyclohexyl-N-diethyl-borazane, i.e. N-cyclohexyl-N-diethyl-borine amine, and pyridine-borine, will be preferred because they are more readily available.

If a metal borohydride of the formula $H_3BZ$ is used as hydrogenating agent, sodium borohydride is chiefly recommended, which is readily obtainable and easy to handle. If a boron halide, e.g. boron trifluoride, is concurrently used, this can also be employed in the form of an addition compound, in particular one added on to an ether, such as tetrahydrofuran.

Suitable inert solvents or dispersing agents for the reactants are aliphatic and aromatic hydrocarbons and ethers, such as tetrahydrofuran, tetrahydropyran and di-n-butyl ether.

The process according to the invention is generally carried out under atmospheric pressure, but it is also possible to use nitrogen or hydrogen under increased pressure, for example the hydrogen which evolves during the process itself if borazanes, i.e. borine amines, are used. The heating in the first step of the process is carried out for about 1 to 5 hours. The subsequent solvolysis is brought about, for example, by the addition of a dilute mineral acid. In this case, the aminoalkyl-silicon compound is isolated from its salt thus formed, by the addition of a dilute alkali metal hydroxide solution and by extraction, for example with ether, the boron remaining in the aqueous phase in the form of boric acid or alkali metal borate. Instead of such a hydrolysis, an alcoholysis will be carried out in those cases where an organo-silicon compound with a hydrolytically splittable bond is present, e.g. an alkoxysilane, and if a siloxane condensation is to be prevented in the process. The solvolysis is then brought about by means of an alcohol, for example methanol, and the boric acid ester thereby formed is separated by distillation from the product of the process.

If the organo-silicon compound to be hydrogenated contains silicon-bound halogen, the hydrogenation can be carried out with an alkali metal or alkaline earth metal borohydride without the addition of a boron halide. In this case, an exchange of the halogen atoms for hydrogen atoms takes place, in addition to the main reaction. The hydrogen-silicon compound thus formed can be converted into the corresponding alkoxy-silicon compound by subsequent alcoholysis.

If more than one halogen atom are bound to one silicon atom, such as e.g. in β-cyanoethyl-methyl-dichloro-silane, hydrogenation by means of a metal borohydride leads to the formation of diborane as a secondary product, which can be combined in known manner with an amine, so that the process according to the invention is coupled with the production of borazanes, i.e. borine amines. Alternatively, the process can be varied in two ways: either the halogen atoms of the silicon compound to be hydrogenated are removed in known manner by partial alcoholysis to such an extent that only one of them remains attached to the silicon atom and the hydrogenation is carried out only thereafter in the manner described above, or only a partial hydrogenation is carried out by means of an alkali metal borohydride so that, besides the formation of amino groups, only a partial exchange of halogen for hydrogen takes place. In the last-mentioned case, the subsequent solvolysis yields the hydrogenation product in the form of an amine-hydrohalide from which a polysiloxane with free amino groups can be obtained by means of an alkaline solution.

The smooth course of the hydrogenation reaction on which the process according to the invention is based was not to be foreseen, as it is known from a number of publications that the boron compounds here employed usually act on organo-silicon compounds with splitting reactions, in particular that boron halides very easily split Si—O—Si as well as Si—O—C bonds, and that boron-hydrogen compounds such as diborane, also in the form of the ammonia addition product, pentaborane, boane/amine addition products, organic derivatives of boron hydrides, react with linear or cyclic organo-polysiloxanes already at room temperature with the formation of cross-linked polymers.

The aminoalkyl-silicon compounds produced according to the invention are suitable, for example, for the known application for the surface modification of glass, especially glass fibres, inorganic fillers and pigments, also for the production of surface-active agents, such as emulsifiers, and for the modification of synthetic resins.

The following examples are given for the purpose of illustrating the invention.

Example 1

2[NC(CH$_2$)$_3$Si(CH$_3$)$_2$]$_2$O+3NaBH$_4$+4BF$_3$
 +12HOCH$_3$→2[H$_2$N(CH$_2$)$_4$Si(CH$_3$)$_2$]$_2$O
  +3NaBF$_4$+4B(OCH$_3$)$_3$+4H$_2$ 89.4 grams (0.33 mol) 1,3-di-(γ-cyanopropyl)-tetramethyl-disiloxane are dissolved in 200 cc. tetrahydrofuran, and this solution is added to a suspension of 22 g. (0.58 mol, 15% excess) sodium borohydride in 100 cc. tetrahydrofuran. To this mixture there is further added dropwise a solution of 98 g. (0.7 mol, 5% excess) of the boron trifluoride/tetrahydrofuran addition product in 200 cc. tetrahydrofuran, and the reaction mixture is boiled under reflux fo one hour. After cooling, 100 cc. methanol and 20 cc. water are added, the solvent is evaporated and the residue taken up with 400 cc. ether. To the ether solution there are added dropwise 500 cc. hydrochloric acid with 10 percent by weight HCl and subsequently an aqueous potassium hydroxide solution with 10 percent by weight KOH, until the reaction is strongly alkaline. The ether layer is separated and subjected to fractional distillation. 82% of the theoretical amount of 1,3-di-(δ-aminobutyl)-tetramethyl-disiloxane are obtained having a boiling point between 114 and 116° C. at 0.7 mm. Hg and refractive index $n_D^{20}$ 1.4510. The constitution is found in accordance with the nuclear magnetic resonance spectrum and the infra-red spectrum.

Example 2

2NC(CH$_2$)$_3$[Si(CH$_3$)$_2$—O]$_{11}$Si(CH$_3$)$_2$(CH$_2$)$_3$CN
 +3NaBH$_4$+4BF$_3$+12HOCH$_3$→2H$_2$N(CH$_2$)$_4$
 [Si(CH$_3$)$_2$—O]$_{11}$Si(CH$_3$)$_2$(CH$_2$)$_4$NH$_2$
  +3NaBF$_4$+4B(OCH$_3$)$_3$+4H$_2$ 30 grams (0.34 mol) of α,ω-(γ-cyanopropyl)-polydimethyl-siloxane which contains 2.9 percent by weight nitrogen and approximately corresponds to the above formula, are dissolved in 300 cc. tetrahydrofuran, and this solution is added to a suspension of 24 g. (0.64 mol, 25% excess) sodium borohydride in 100 cc. tetrahydrofuran. To this mixture there is further added dropwise a solution of 105 g. (0.75 mol, 10% excess) of the boron trifluoride/tetrahydrofuran addition product in 200 cc. tetrahydrofuran, and the reaction mixture is boiled under reflux for one hour. After cooling, 200 cc. methanol are added, the solvent is evaporated and the residue taken up with 400 cc. ether. The ether solution is filtered, 400 cc. hydrochloric acid with 10 percent by weight HCl are added to the filtrate, and the mixture is allowed to stand overnight. An aqueous potassium hydroxide solution with 10 percent by weight KOH is then added until the reaction is strongly alkaline, the ether layer is separated, dried over sodium sulphate and the ether evaporated. The remaining oil is heated up to 80° C. at 1 mm. Hg and filtered. As the filtrate there are obtained 264 g. of a viscous oil which has refractive index $n_D^{20}$ 1.4239 and contains a total of 2.6 percent by weight of nitrogen, and 2.4 percent by weight of basic nitrogen. In the infra-red spectrum the absorption band of the nitrile groups can no longer be detected at 4.5μ.

Example 3

4NC—CH—CH$_2$—Si(CH$_3$)$_2$—O—Si(CH$_3$)$_2$—CH$_2$ + 3NaBH$_4$ + 4BF$_3$ + 12H$_2$O ⟶

4H$_2$N—CH$_2$—CH—CH$_2$—Si(CH$_3$)$_2$—O—Si(CH$_3$)$_2$—CH$_2$ + 3NaBF$_4$ + 4B(OH)$_3$ + 4H 176 grams (0.88 mol) 4-cyano-2,2,6,6-tetramethyl-1-oxa-2,6-disila-cyclohexane are dissolved in 200 cc. anhydrous tetrahydrofuran, and this solution is added to a suspension of 29 g. (0.76 mol, 15% excess) sodium borohydride in 100 cc. tetrahydrofuran. To this mixture there is added dropwise with stirring a solution of 130 g. (0.93 mol) of boron trifluoride/tetrahydrofuran addition product in 200 cc. tetrahydrofuran, and the reaction mixture is boiled under reflux for one hour, while stirring. The solvent is then substantially evaporated, the residue taken up with 400 cc. ether and the precipitated sodium tetrafluoroborate is separated by filtration. To the filtrate there are added dropwise 500 cc. hydrochloric acid and, after standing overnight, a potassium hydroxide solution, as described in Example 2. The ether layer is separated, the aqueous phase extracted with ether and the combined extracts are dried with solid potassium hydroxide. By fractional distillation through a column there are obtained 145 g. (81% of the theoretical amount) 4-aminomethyl - 2,2,6,6 - tetramethyl-1-oxa-2,6-disila-cyclohexane with boiling point 92° C. at 13 mm. Hg and refractive index $n_D^{20}$ 1.4518.

The analysis shows 47.4% C; 10.1% H; 6.9% N; molecular weight 214 (osmotically in acetone). For C$_8$H$_{21}$NOSi$_2$.

Calculated: 47.2% C; 10.4% H; 6.9% N; molecular weight 203.

Example 4

6 grams (0.028 mol) 4 - carbamido - 2,2,6,6 - tetramethyl-1-oxa-2,6-disila-cyclohexane are dissolved in 50 cc. tetrahydropyran, and this solution is added to a suspension of 1.65 g. (0.043 mol) sodium borohydride in 20 cc. tetrahydrofuran. To this mixture there is further added a solution of 7.5 g. (0.054 mol) of boron trifluoride/tetrahydrofuran addition product in 50 cc. tetrahydrofuran, and the reaction mixture is boiled under reflux for 4 hours. The further procedure is the same as that described in Example 3, but only 100 cc. each of ether and hydrochloric acid are used. By fractional distillation there are obtained 4 g. (about 70% of the theoretical amount) 4 - aminomethyl - 2,2,6,6 - tetramethyl-1-oxa-2,6-disila-cyclohexane with boiling point 45° C. at 0.4 mm. Hg and refractive index $n_D^{20}$ 1.4521, which can be identified by the infra-red spectrum.

Example 5

NC(CH$_2$)$_3$Si(CH$_3$)$_2$Cl+NaBH$_4$+4HOCH$_3$→
 H$_2$N(CH$_2$)$_4$—Si(CH$_3$)$_2$OCH$_3$+NaCl
  +B(OCH$_3$)$_3$+2H$_2$ 162 grams (1 mol) (γ-cyanopropyl-dimethyl-chlorosilane are dissolved in 200 cc. tetrahydrofuran, this solution is added dropwise to a suspension of 45.5 g. (1.2 mol) sodium borohydride in 200 cc. tetrahydrofuran, and the reaction mixture is then boiled under reflux for 4 hours. After cooling, the precipitated sodium chloride is separated by filtration. Therein 85% of the chlorine used are determined by titration.

The solvent is evaporated from the filtrate, and 300 cc. anhydrous methanol are added dropwise to the residue whereupon a vigorous evolution of gas occurs. The excess methanol is then substantially distilled off on a water bath, and the addition of methanol and the distilling off are repeated twice. By fractional distillation of the residue there are finally obtained 70% of the theoretical amount of δ-aminobutyl-dimethyl-methoxysilane with boiling point 85° C. at 17 mm. Hg and refractive index $n_D^{20}$ 1.4325. The constitution can be confirmed by the nuclear magnetic resonance spectrum and the infra-red spectrum.

Example 6

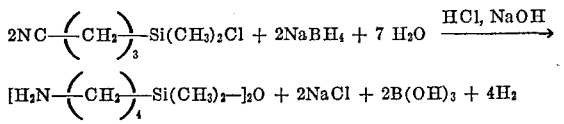

162 grams (1 mol) γ-cyanopropyl-dimethyl-chlorosilane are dissolved in 200 cc. tetrahydrofuran, this solution is added dropwise to a stirred suspension of 47 g. (1.25 mol) sodium borohydride in 300 cc. tetrahydrofuran, and the reaction mixture is boiled under reflux for 5 hours. The precipitated sodium chloride and the excess sodium borohydride are separated by filtration, the solvent is substantially evaporated from the filtrate and the residue taken up with 250 cc. ether. The solution is acidified with hydrochloric acid (10 percent by weight HCl) whereupon hydrogen evolves. An aqueous sodium hydroxide solution with 10 percent by weight NaOH is then added until the reaction is alkaline, the ether layer is separated, dried over sodium sulphate and distilled. A small amount of first runnings with boiling point 30° C. at 3 mm. Hg and refractive index $n_D^{20}$ 1.4365 can be identified by spectroscopy as δ-aminobutyl-dimethylsilane. The main fraction of 74% of the theoretical amount consists of 1,3-di(δ-aminobutyl)-tetramethyl-disiloxane with boiling point 120° C. at 1 mm. Hg and refractive index $n_D^{20}$ 1.4511; its constitution can be confirmed by the nuclear magnetic resonance spectrum.

Example 7

NC(CH$_2$)$_2$—Si(CH$_3$)Cl$_2$+2NaBH+(C$_2$H$_5$)$_3$N
  +5HOCH$_3$→H$_2$N(CH$_2$)$_3$—Si(CH$_3$)(OCH$_3$)$_2$+2NaCl
                  +(C$_2$H$_5$)$_3$N·BH$_3$+B(OCH$_3$)$_3$+3H$_2$ 168 grams (1 mol) β-cyanoethyl-methyl-dichlorosilane are dissolved in 200 cc. tetrahydrofuran, this solution is added dropwise to a suspension of 83 g. (2.2 mol) sodium borohydride in 200 cc. tetrahydrofuran, and the reaction mixture is boiled under reflux under an argon atmosphere for 4 hours. 101 grams (1 mol) triethylamine are then added and the mixture is filtered after cooling. In the filter residue dissolved in water, 90% of the chlorine used can be determined by titration.

The solvent is evaporated from the filtrate on a water bath, and N-triethyl-borazane is distilled off from the residue at 108° C. and at 26 mm. Hg.

250 cc. methanol are added to the residue, the mixture is again concentrated by evaporation on a water bath and this operation is repeated. By fractional distillation of the residue through a column there are obtained 106 g. (65% of the theoretical amount) γ-aminopropyl-methyl-dimethoxysilane with boiling point 84° C. at 13 mm. Hg and refractive index $n_D^{20}$ 1.4272. The constitution can be confirmed by the nuclear magnetic resonance spectrum and the infra-red spectrum.

The residue after distillation consists of the hydrochloride of γ-aminopropyl-methyl-dimethoxy-silane.

Example 8

123 grams (0.057 mole) of a siloxane-silcarbane copolymer which contains 2.6 percent by weight nitrogen and, on average, approximately corresponds to the above formula, are dissolved in 250 cc. isopropylbenzene, 32 g. (0.28 mol) N-triethyl-borazane are added to this solution and the mixture is heated at a temperature between 140 and 150° C. for 2 hours. The solvent and the excess borazane are then evaporated by heating up to 110° C. at 2 mm. Hg and the highly viscous residue is decomposed with a mixture of 300 cc. methanol and 20 cc. water. The volatile components are distilled off, 300 cc. anhydrous methanol again added, the volatile components distilled off, and the operation is repeated once more, in order to drive off azeotropically the residual boron compounds. The residue is finally heated up to 100° C. at 1 mm. Hg and filtered. As the filtrate there are obtained 116 g. of a colourless viscous oil with refractive index $n_D^{20}$ 1.4269 and a nitrogen content of 2.3 percent by weight. Nitrile groups are no longer indicated in the infra-red spectrum.

What we claim is:

1. Process for the production of aminoalkyl-silicon compounds by hydrogenation of organo-silicon compounds containing carbon-bonded nitrogen, which comprises reacting an organo-silicon compound selected from the group consisting of monomeric silane of the general formula

and linear and heterocyclic silicon compounds of the general formulae

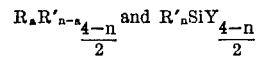

in which each substituent X is selected from the group consisting of alkoxy and aroxy radicals and halogen atoms, each substituent R is a radical selected from the group consisting of cyanoalkyl and carbamidoalkyl, having at least 3 carbon atoms in a chain between the nitrogen atom and the silicon atom, each substituent R' is a radical selected from the group consisting of alkyl, cycloalkyl, aryl, and neutrally substituted alkyl, cycloalkyl and aryl, and the beforesaid substituents X, each substituent Y is a member which is bonded to two silicon atoms and which is selected from the group consisting of an oxygen atom and beta-substituted propylene radicals having the formulae

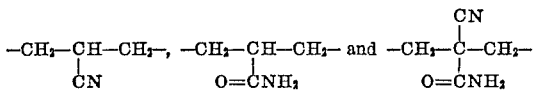

at least one such substituent Y being β-substituted propylene, $a$ is a positive number of at most 1, and $n$ is a number greater than 1 and at most equal to 3, at a temperature between 30 and 200° C., with a complex boron-hydrogen compound of the general formula H$_3$BZ, in which Z is a ligand selected from the group consisting of amines, alkali metal hydrides and alkaline earth metal hydrides, in the case of the said metal hydrides, if none of the substituents X is a halogen atom, in the presence of a boron halide, and solvoylzing the primary product by the addition of an agent selected from the group consisting of water, dilute acid, alkali metal hydroxide solution, and alcohols, and recovering the end product.

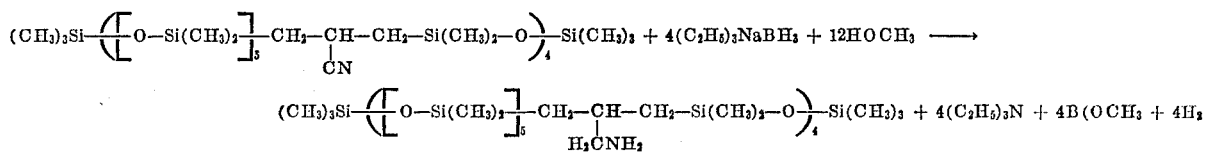

2. Process according to claim 1, wherein the reaction is carried out in an inert medium selected from the group consisting of solvents and dispersing agents.

3. Process for the production of aminoalkyl-organosilicon compounds by hydrogenation of organosilicon compounds containing carbon-bound nitrogen which comprises reacting an organosilicon compound selected from the group consisting of monomeric silanes having the formula $$\begin{array}{c} R' \\ | \\ R-Si-X \\ | \\ R' \end{array}$$

linear and heterocyclic silicon compounds having the general formula $$R_a R'_{n-a} SiO_{\frac{4-n}{2}}$$

and linear and heterocyclic silicon compounds having the general formula $$R'_n SiY_{\frac{4-n}{2}}$$

in which each X respectively is selected from the group consisting of alkoxy radicals, aryloxy radicals, and halogen atoms, each R respectively is selected from the group consisting of cyanoalkyl and carbamidoalkyl, each such alkyl having at least 3 carbon atoms in the chain between the nitrogen and silicon atom, each R' respectively is selected from the group consisting of alkyl, cycloalkyl, aryl, neutrally substituted alkyl, neutrally substituted cycloalkyl, neutrally substituted aryl, alkoxy radicals, aryloxy radicals, and halogen atoms, each Y respectively is a member which is bonded to two silicon atoms, and which is selected from the group consisting of an oxygen atom and β-substituted propylene which is selected from the group consisting of those having the formulae $$-CH_2-CH-CH_2-,\ -CH_2-CH-CH_2-,\ \text{and}\ -CH_2-C-CH_2-$$
$$\ \ \ \ \ \ \ \ \ |\ \ \ \ \ \ \ \ \ \ \ \ \ \ \ \ \ \ \ \ |\ \ \ \ \ \ \ \ \ \ \ \ \ \ \ \ \ \ \ \ \ \ \ \ |$$
$$\ \ \ \ \ \ \ \ \ CN\ \ \ \ \ \ \ \ \ \ \ \ \ O=C-NH_2\ \ \ \ \ \ \ \ \ \ O=C-NH_2$$

at least one such substituent Y being said β-substituted propylene, $a$ is a positive number having a value of at most 1, and $n$ is a number having a value greater than 1 and at most equal to 3, with a complex boron-hydrogen compound of the general formula $$H_3BZ$$

in which Z is a ligand selected from the group consisting of amines, alkali metal hydrides and alkaline earth metal hydrides, provided that where each X is selected from the group consisting of alkoxy and aryloxy and Z is selected from the group consisting of alkali metal hydrides and alkaline earth metal hydrides, the reaction is carried out also in the presence of a boron halide, solvolyzing the resultant aminoalkyl-organosilicon compound with an agent selected from the group consisting of water, dilute inorganic acid, alkali metal hydroxide solution, and an alcohol, and recovering the aminoalkyl-organosilicon compound thereby formed.

4. Process according to claim 3 wherein the reacting is carried out at a temperature substantially between about 30–200° C.

5. Process according to claim 4 wherein the reacting is carried out in an inert organic medium selected from the group consisting of solvents and dispersing agents.

6. Process according to claim 5 wherein said medium is selected from the group consisting of aliphatic hydrocarbons, aromatic hydrocarbons, linear aliphatic ethers, cyclic aliphatic ethers, and mixtures thereof.

7. Process according to claim 6 wherein said medium is a $C_5$–$C_6$ cycloalkyl ether.

8. Process according to claim 6 wherein said medium is a $C_1$–$C_4$ alkyl substituted benzene.

9. Process according to claim 4 wherein the solvolyzing is carried out with a $C_1$–$C_4$ alkylol.

10. Process according to claim 4 wherein such boron halide is borontrifluoride - tetrahydrofuran addition product.

11. Process according to claim 4 wherein said complex boron-hydrogen compound is sodium borohydride.

12. Process according to claim 4 wherein said complex boron-hydrogen compound is N-tri-$C_1$–$C_4$ alkyl-borine-amine.

13. Process according to claim 4 wherein said organosilicon compound is γ-cyanopropyl-dimethyl-chlorosilane.

14. Process according to claim 4 wherein said organosilicon compound is β-cyanoethyl-methyl-dichlorosilane.

15. Process according to claim 4 wherein said organosilicon compound is 1,3-di-(γ-cyanopropyl)-tetramethyldisiloxane.

16. Process according to claim 4 wherein said organosilicon compound is α,ω-di(γ'-cyanopropyl)-polydimethylsiloxane having about 11 dimethyl siloxy units.

17. Process according to claim 4 wherein said organosilicon compound is 4-cyano-2,2,6,6-tetramethyl-1-oxa-2,6-disila-cyclohexane.

18. Process according to claim 4 wherein said organosilicon compound is 4-carbamido-2,2,6,6-tetramethyl-1-oxa-2,6-disila-cyclohexane.

19. Process according to claim 4 wherein said organosilicon compound is siloxane-silcarbane copolymer end stopped with trimethyl silyl groups and having about 20 dimethyl siloxy units separately interrupted by about 4 distinct $$\begin{array}{c} CN \\ | \\ -CH_2-CH-CH_2- \end{array}$$

groups each attached to adjacent silicon atoms.

References Cited

UNITED STATES PATENTS

| | | | |
|---|---|---|---|
| 2,930,809 | 3/1960 | Jex et al. | 260—448.8 |
| 3,046,295 | 7/1962 | Lisanke et al. | 260—448.8 |
| 3,112,332 | 11/1963 | Pike | 260—448.2 |
| 3,171,851 | 3/1965 | Pepe | 260—448.2 |
| 2,856,428 | 10/1958 | Brown | 260—570.9 |
| 3,026,355 | 3/1962 | Johnston | 260—577 |

OTHER REFERENCES

The Merck Index of Chemicals and Drugs, seventh edition, Merck and Co., Inc. (1960), p. 1057.

N. G. Gaylord, J. Chem. Education, 34 (1957), pp. 371–374.

H. C. Brown, J. Chem. Education, 38 (1961), pp. 178–179.

H. C. Brown et al., Chem. Abs., Jan. 25, 1957, 1077c.

TOBIAS E. LEVOW, Primary Examiner

J. P. PODGORSKI, Assistant Examiner

U.S. Cl. X.R.

260—448.8

FO-1050
(5/69)

UNITED STATES PATENT OFFICE
CERTIFICATE OF CORRECTION

Patent No. 3,458,553      Dated July 29, 1969

Inventor(s) Hans Niederprüm, Elmar-Manfred Horn and Walter Simmler

It is certified that error appears in the above-identified patent and that said Letters Patent are hereby corrected as shown below:

Column 3, line 19, in the left part of the structural formula "($OH_3$) should be --($CH_3$)--; also in the top right part of the structural formula "$CO_3$" should be --$CH_3$--; column 3, line 32, in the bottom left part of the structural formula "$CH_2$" should be --$CH_3$--; column 5, line 2, "boane/amine" should be --borane/amine--; column 5, line 35, "fo" should be --for--; column 5, line 55, "30" should be --330--; column 6, line 13, in Example 3 the "+ 4H" at the end should be -- + $4H_2$ --; column 6, line 64, cancel the opening parenthesis before "($\gamma$-cyanopropyl-"; column 7, line 40, "2NaBH" should be --$2NaBH_4$--; column 8, line 35, "$RaR'_{n-a}$" should be --$RaR'_{n-a}SiO$--

SIGNED AND
SEALED
MAY 19 1970

(SEAL)
Attest:

Edward M. Fletcher, Jr.
Attesting Officer

WILLIAM E. SCHUYLER, JR.
Commissioner of Patents